United States Patent [19]

Finnell et al.

[11] Patent Number: 4,654,787
[45] Date of Patent: Mar. 31, 1987

[54] APPARATUS FOR LOCATING MEMORY MODULES HAVING DIFFERENT SIZES WITHIN A MEMORY SPACE

[75] Inventors: James S. Finnell; Steven C. Steps, both of San Jose, Calif.

[73] Assignee: Hewlett-Packard Company, Palo Alto, Calif.

[21] Appl. No.: 518,601

[22] Filed: Jul. 29, 1983

[51] Int. Cl.⁴ .............................................. G06F 13/00
[52] U.S. Cl. .................................... 364/200; 364/900
[58] Field of Search ... 364/200 MS File, 900 MS File

[56] References Cited

U.S. PATENT DOCUMENTS

| | | | |
|---|---|---|---|
| 4,115,851 | 9/1978 | Nagano et al. | 364/200 |
| 4,236,207 | 11/1980 | Rado et al. | 364/200 |
| 4,254,463 | 3/1981 | Busby et al. | 364/200 |
| 4,323,965 | 4/1982 | Johnson et al. | 364/200 |
| 4,468,729 | 8/1984 | Schwartz | 364/200 |

*Primary Examiner*—Thomas M. Heckler
*Assistant Examiner*—Christina M. Eakman
*Attorney, Agent, or Firm*—Douglas A. Kundrat

[57] ABSTRACT

The individual RAMs comprising the memory space of a computer may be of various sizes and are automatically located within a memory space during initialization and address enable information is stored in ID-RAMs on each RAM card. Shift registers on the RAM cards are connected in series and an ID bit is serially clocked through the shift registers during initialization. At each clock pulse the contents of the shift registers are written to the ID-RAMs of each RAM card. The presence of an ID bit at a specific memory location in an ID-RAM on a RAM card indicates that card is to be enabled when the memory location address is accessed; the location of the ID bit within the memory location indicates the particular RAM on the RAM card to be accessed. A detector monitors a transfer of the ID bit between adjacent shift registers so that card memory boundaries, and RAM size, may be known.

6 Claims, 5 Drawing Figures

APPARATUS FOR LOCATING MEMORY MODULES HAVING DIFFERENT SIZES WITHIN A MEMORY SPACE

BACKGROUND AND SUMMARY OF THE INVENTION

The memory space of a computer is often composed of random access memories (RAMs) residing on RAM cards which are connected to the data and address busses of the computer. The RAMs, which may be of different sizes such as 64K and 256K, each have a predetermined address within the memory space and each individual RAM memory location has a specific address within the RAM. In practice, the upper bits of a memory address specify a particular RAM and the lower bits specify a given memory location within that RAM.

In computers which are constructed according to the prior art it is known to specify the location of a RAM within the memory space by physically setting an address on a switch array. A given RAM is enabled when a comparator on the RAM card indicates that an address on the bus is the same as the RAM address on the switch array. In such prior art computers it is necessary for the user to set the specified address of each RAM on the RAM card switch array. The use of such switches introduces the possibility of user error and user-caused damage to the computer.

In accordance with the illustrated preferred embodiment of the present invention, the RAMs comprising the 32 bit wide memory space of a computer are automatically located within the memory space and address enable information is stored in ID-RAMs on each RAM card. The RAM cards are physically placed in the computer back plane so that the RAMs are located within the memory space in a descending order by size. Each RAM card includes three RAMs, a data buffer, an ID-RAM and a three cell shift register. Each shift register cell is capable of storing a single bit. The shift registers of the various RAM cards are connected in series and during initialization an ID "1" bit is clocked through the shift registers. A detector detects a transfer of the ID bit between two adjacent RAM cards so that the memory boundaries of each RAM card, and the size of the RAMs on each RAM card, may be determined. At each clock pulse the three bit contents of each shift register are written to the ID-RAM for that shift register. Thus, only twelve memory locations within each ID-RAM of a 256K RAM card, and three memory locations within the ID-RAM of a 64K RAM card, contain an ID bit and the addresses of those ID-RAM memory locations comprise the upper bits of the addresses of the RAMs on the RAM cards. The location of the ID bit within the three bit memory location indicates which of the three RAMs on a RAM card is thereby accessed. The lower bits of the address specify individual memory locations within each RAM.

DETAILED DESCRIPTION OF THE PREFERRED EMBODIMENT

Figure 1:
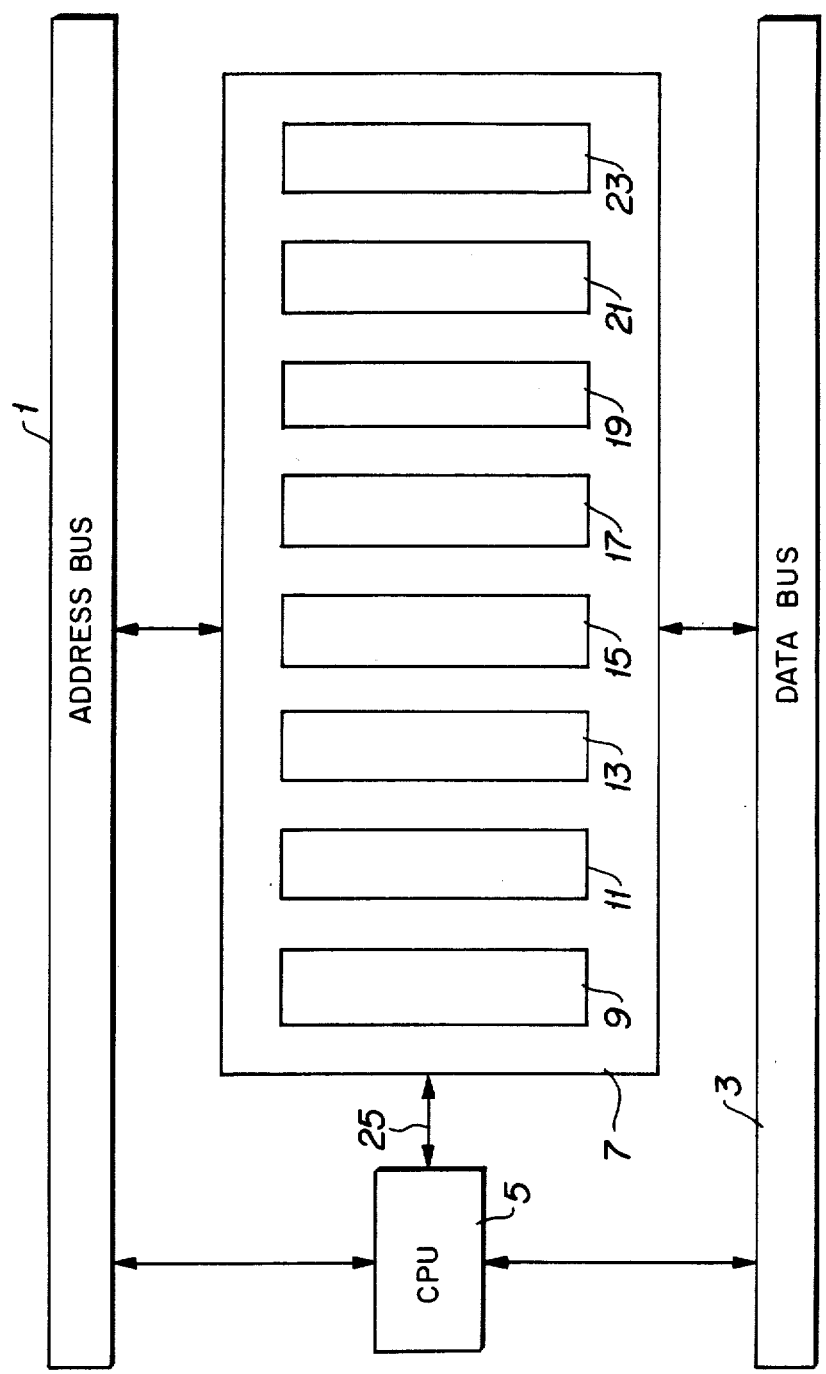
FIG. 1 shows the connections of the memory space of a computer which is constructed in accordance with the preferred embodiment of the present invention.

FIG. 1 shows a computer which is constructed in accordance with the preferred embodiment of the present invention. A CPU 5 is connected to a 32 bit wide memory space 7 by a data bus 3, an address bus 1 and control lines 25. Memory space 7 comprises various RAM cards 9–23 which in turn each contain a number of RAMs in which the individual memory locations are physically located.

Figure 2:
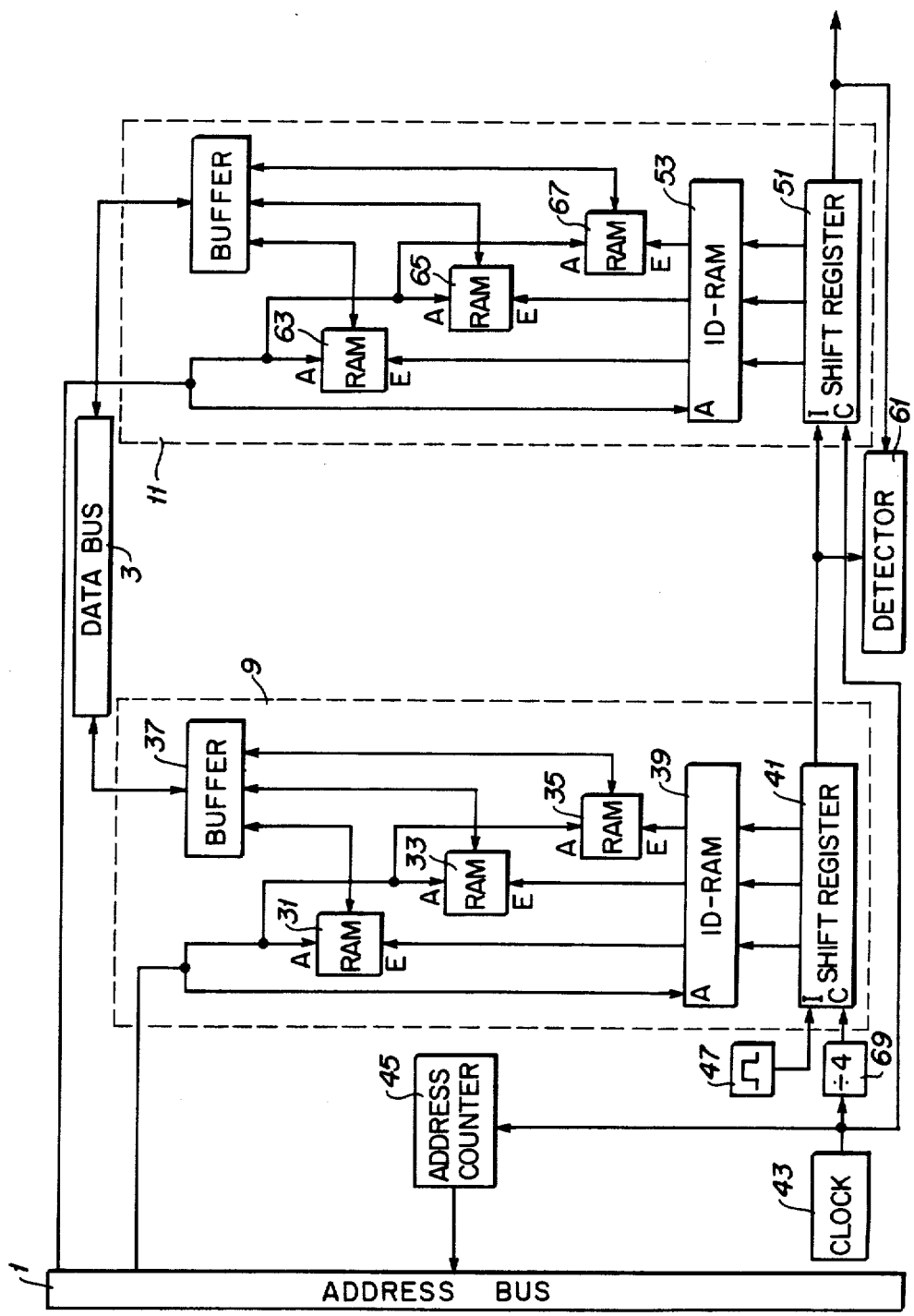
FIG. 2 shows two of the RAM cards depicted in FIG. 1.

FIG. 2 shows two of the RAM cards 9 and 11 which are depicted in FIG. 1. The RAM cards 9–23 are located in the back plane of the computer so that the individual RAMs are located in memory space 7 in a descending order by size. RAM card 9 includes 256K RAMs 31, 33 and 35 which are connected by a buffer 37 to the data bus 3. RAM card 11 includes 64K RAMs 63, 65 and 67. It is important to note that each RAM card of memory space 7 is not limited to an even number of RAMs as is the case in the prior art. The address bus 1, which may comprise a 23-bit bus, is connected to the three RAMs 31, 33 and 35 and to an ID-RAM 39. The seven most significant bits of an address on address bus 1 are routed to the ID-RAM 39 and the lower address bits are routed to address pins A of the three RAMs 31, 33 and 35. The ID-RAM 39 comprises a four bit wide 1K static RAM of which only 128 memory locations (each being three bits wide) are used. The number of columns in ID-RAM 39 is equal to the number of RAMs on RAM card 9 and the number of rows (128) of ID-RAM 39 is equal to the total number of RAMs in memory space 7. Each of the three columns within ID-RAM 39 is connected to read one of the three bits cells of shift register 41. Each column of ID-RAM 39 is also connected to an enable (E) input of one of the RAMs 31, 33 or 35.

Figures 3, 5:
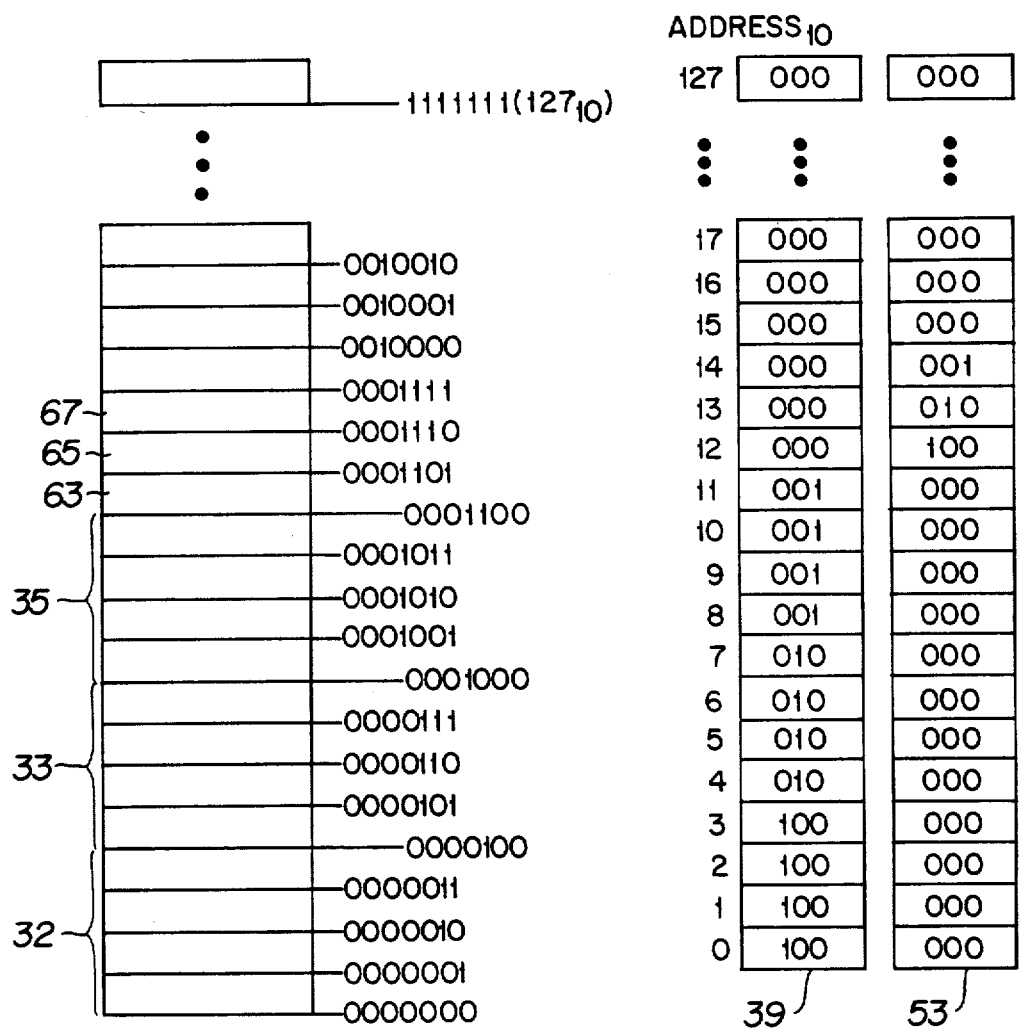
FIG. 3 shows the addresses of the RAMs depicted in FIG. 2
FIG. 5 shows the contents of the ID-RAMs depicted in FIG. 2 after memory initialization has been performed according to the flow chart of FIG. 4.

To initialize the memory space 7 a clock 43 generates clock pulses to an address counter 45 and to a divide-by-four divider 69 which presents the divided output to a clock (C) input of shift register 41. The divider 69 may be fabricated from D-type flip flops and is constructed to provide a divided output of 1-0-0-0-1 (instead of the more usual 0-0-0-1-0) for an input of 1-1-1-1-1. The divider 69 allows memory space 7 to be broken into 64K blocks (as shown in FIG. 3) even though the 256K RAMs 31, 33 and 35 of RAM card 9 are four times the size of the RAMs 63, 65 and 67 of RAM card 11. The RAM cards in memory space 7 which have 256K RAMs are identical to RAM card 9 shown in FIG. 2 and the RAM cards which have 64K RAMs are identical to RAM card 11. The seven-bit counter 45 is incremented at each clock pulse and presents a seven bit count to address bus 1 to identify a particular RAM. Bus 1 presents the seven bit count as the upper seven bits of an address to an address (A) pin of ID-RAM 39 to access a specific memory location within ID-RAM 39. A bit generator 47 presents an ID "1" bit to an input (I) pin of shift register 41 (located on the bottom RAM card 9 of the memory space 7) during the first clock pulse after power is applied to the computer and thereafter presents a "0" bit. The shift register 41 is connected in series with a shift register 51 of the next RAM card 11 in the memory space 7. The shift registers of all of the RAM cards 9–23 located in memory space 7 are connected in series and the ID "1" bit may be clocked through the individual cells of the shift registers serially. Detector 61 is connected to a line between shift registers 41 and 51 and also to lines connecting the other shift registers. In this manner, detector 61 detects the transfer of the ID bit between adjacent shift registers, CPU 5 may then store the instantaneous contents of counter 45 as the seven bit address of the first RAM of the next RAM card to locate the memory boundaries of adjacent RAM cards. This allows CPU 5 to determine the sizes (e.g., 64K or 256K) of the RAM modules on the various RAM cards.

FIG. 3 shows the addresses of the various RAMs located in memory space 7. RAM 31 (256K) is located at address 0000000, RAM 33 (256K) is located at address 0000100, and RAM 35 (256K) is located at address 0001000, etc. 64K RAMs 63, 65 and 67 are located at addresses 0001100, 0001101 and 0001110, respectively. The upper seven bits of a 23-bit address on address bus 1 specify a particular 64K memory block (and, therefore, a particular RAM) out of the 128 possible memory blocks and the lower sixteen bits specify a particular location within that RAM.

Figure 4:
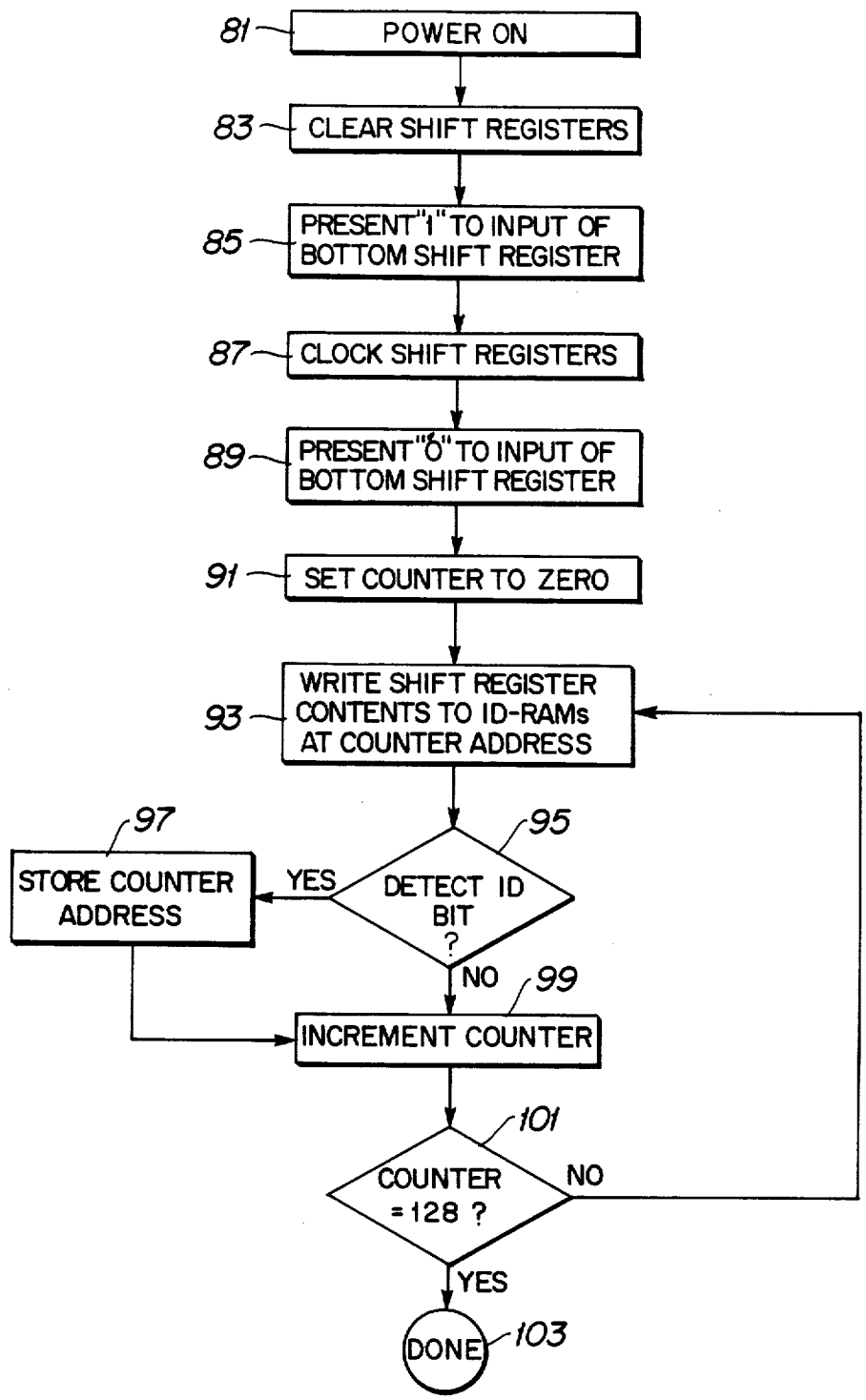
FIG. 4 is a flow chart of the memory initialization functions performed by the computer shown in FIGS. 1 and 2.

FIG. 4 is a flow chart of the functions performed by the computer during initialization of memory space 7 when power step 83, following turn on, step 81 all of the three-bit shift registers, including shift register 41 on RAM card 9 and shift register 51 on RAM card 11, are cleared and the cell contents are reset to zero. In step 85, generator 47 presents an ID "1" bit to the input (I) pin of the shift register 41 on the RAM card 9 which is located at the bottom of memory space 7. When the first divided clock pulse is generated by divider 69 the ID bid is read into the left cell of shift register 41. Generator 47 thereafter, in step 89, presents a "0" bit to the input I pin of shift register 41. The seven bit address counter 45 is reset to zero by the first clock pulse in step 91.

The seven bits of counter 45 are routed, via address bus 1, to the A pins of all of the ID-RAMs in memory space 7. Since the counter 45 is set to 0 at this point the lowest memory location (address 0) of each of the ID-RAMs is accessed. The contents of the three cells of each shift register are written into the accessed memory location of the ID-RAM on each shift register's RAM card in step 93. Thus, the address 0 memory location of ID-RAM 39 is loaded with the three-bit code "100". All of the other ID-RAMs in memory space 7 have address 0 memory locations loaded with code "000". When another clock pulse is generated by clock 43, address counter 45 is incremented in step 99, and the initialization function is terminated, in steps 101 and 103, if the contents of counter 45 are 128. Upon termination the clock 43 is disconnected from the shift register 41 and desired addresses may be supplied to address bus 1 by CPU 5 in order to access memory space 7.

During initialization, at each clock pulse the counter 45 is incremented and the three bit contents of each shift register contents are stored in a memory location of an associated ID-RAM. At each clock pulse (or divided clock pulse for a 256K RAM card) the ID bit is shifted one cell to the right through the shift registers of memory space 7 to break the memory space into 64K blocks as shown in FIG. 3. In steps 95 and 97, the detector 61 detects the transfer of the ID bit between adjacent RAM cards and the counter 45 address is stored as the seven bit address of the first RAM of the next RAM card. FIG. 5 shows that each 64K RAM card has three ID-RAM memory locations containing an ID bit and each 256K RAM card has twelve ID-RAM memory locations containing an ID bit. Conceptually, the rows within each ID-RAM may be viewed as RAM card enables and the columns may be viewed as individual RAM enables.

Once the initialization function has been completed, CPU 5 may access a specific memory location within memory space 7 by presenting a 23-bit address to address bus 1. The upper seven bits of the address are routed to the A pins of all of the ID-RAMs and the lower 16 bits are routed to the A pins of the various individual RAMs. The upper seven bits cause identical memory locations in each ID-RAM to be accessed and the three bits contained therein are presented to the enable (E) pins of the three RAMs on each RAM card. Only a single RAM module is thereby enabled. The lower sixteen bits of the address allow a particular memory location within the enabled RAM to be accessed. For example, if the 23-bit address 00000100000000000000000 is presented to address bus 1 the upper seven bits (0000010) are routed to the A pins of the ID-RAMs and the lower (all zero) sixteen bits are routed to the A pins of the RAMs. From FIG. 5 it can be seen that the only ID-RAM having a memory location 0000010 with non-zero contents is ID-RAM 39 on RAM card 9. Memory location 0000010 in ID-RAM 39 contains "100" so that a "1" is presented to the E pin of RAM 31, a "0" is presented to the E pin of RAM 33 and a "0" is presented to the E pin of RAM 35. The result is that only the 256K RAM 31 in memory space 7 is enabled and the lower sixteen bits of the address cause the memory location at row 0, column 0, of RAM 31 to be accessed by CPU 5.

We claim:

1. An initialization circuit for initializing a memory space having a plurality of RAMs residing on a plurality of RAM cards with n RAMs on each RAM card and for detecting boundary addresses between RAM cards, the circuit comprising:

clock means for generating a clock signal;

pulse means for generating a "1" bit;

an address counter coupled to the clock for receiving the clock signal and for generating an address in response thereto;

a plurality of serially coupled n-cell shift registers, each shift register being associated with a particular RAM card and having a data input and a data output and also being coupled to the clock, wherein the data input of a first shift register is coupled to the pulse means for receiving the "1" bit such that the "1" bit may be serially clocked through the plurality of shift registers;

detector means, coupled to the data output of each shift register and to the address counter, for detecting flow of the "1" bit between shift registers and for detecting the address thereupon;

a plurality of ID-RAMs, each ID-RAM having a plurality of n-bit memory locations arranged in n columns by bit and being associated with a particular RAM card, each ID-RAM also having an address input coupled to the address counter and a data input coupled to the shift register associated with that particular RAM card for receiving the n-bit contents of that shift register;

wherein each of the n RAMs on each RAM card has an enable input coupled to a one of the n columns of bits within the associated ID-RAM;

such that upon each occurrence of a clock signal the n-bit contents of each shift register are stored in that memory location of the associated ID-RAM that is identified by a current address generated by the address counter thereby initializing the memory space so that, after initialization, presentation of a desired address to the address inputs of the plurality of ID-RAMs enables only that single desired RAM associated with that particular ID-RAM containing a "1" bit in that memory location identified by the desired address at that column coupled to the desired RAM; and such that detection of the "1" bit by the detector means defines the boundary address between RAM cards.

2. A circuit as in claim 1, wherein:

each of the plurality of RAMs has the same memory capacity; and the number of memory locations within each ID-RAM is equal to the number of RAMs in the memory space.

3. A circuit as in claim 2, further comprising:

an address bus, coupled between the address counter and the address inputs of the ID-RAMs and the RAMs;

the address bus being operative for receiving a desired address and for presenting an upper portion to the address inputs of the ID-RAMs and a lower portion to the address inputs of the RAMs; and such that the upper portion selects the desired RAM within the memory space and the lower portion selects a desired location within the desired RAM.

4. A circuit as in claim 1, wherein:

a first number of the RAM cards contain RAMs of a first memory capacity;

a second number of the RAM cards contain RAMs of a second memory capacity that is M times greater than the first memory capcity; and each of the second number of RAM cards includes a divider conected between the clock and the clock input of that shift register associated with that RAM card, the divider being operative for division by M.

5. A circuit as in claim 4, wherein the number of memory locations in each ID-RAM is equal to the first number added to M times the second number.

6. A circuit as in claim 5, further comprising:

an address bus, coupled between the address counter and the address inputs of the ID-RAMs and the RAMs;

the address bus being operative for receiving a desired address and for presenting an upper portion to the address inputs of the ID-RAMs and a lower portion to the address inputs of the RAMs; and such that the upper portion selects the desired RAM within the memory space and the lower portion selects a desired location within the desired RAM.

* * * * *

UNITED STATES PATENT AND TRADEMARK OFFICE
CERTIFICATE OF CORRECTION

PATENT NO. : 4,654,787
DATED : March 31, 1987
INVENTOR(S) : James S. Finnell et al It is certified that error appears in the above-identified patent and that said Letters Patent is hereby corrected as shown below:

Column 2, line 37, "columns in ID-RAM" should read -- columns (three) in ID-RAM --.

Column 2, line 41, "one of the three bits cells" should read -- one of the three cells --.

Column 3, line 38, "ID bid" should read -- ID bit --.

Column 3, line 58 "clock 43 is disconnected from the shift register 41" should read --clock 43 is turned off--.

Column 3, line 61, "During initialization, at each clock pulse the counter" should read -- At each clock pulse during initialization, the counter --.

Column 3, line 63, "register contents are stored" should read -- register are stored --.

Column 4, line 21, "Only a single RAM module is thereby enabled." should read -- Only a single RAM is thereby enabled. --.

Signed and Sealed this

Eighth Day of December, 1987

Attest:

DONALD J. QUIGG

Attesting Officer

Commissioner of Patents and Trademarks